United States Patent
Qin

(10) Patent No.: US 10,209,836 B2
(45) Date of Patent: Feb. 19, 2019

(54) ARRAY SUBSTRATE, TOUCH SCREEN AND DISPLAY APPARATUS CONTAINING THE SAME, AND METHOD FOR DRIVING THE SAME

(71) Applicant: BOE TECHNOLOGY GROUP CO., LTD, Beijing (CN)

(72) Inventor: Wei Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/122,737

(22) PCT Filed: Dec. 28, 2015

(86) PCT No.: PCT/CN2015/099127
§ 371 (c)(1),
(2) Date: Aug. 31, 2016

(87) PCT Pub. No.: WO2017/024731
PCT Pub. Date: Feb. 16, 2017

(65) Prior Publication Data
US 2017/0177111 A1    Jun. 22, 2017

(30) Foreign Application Priority Data

Aug. 13, 2015 (CN) .......................... 2015 1 0498034

(51) Int. Cl.
*G06F 3/044* (2006.01)
*G09G 3/36* (2006.01)
*G02F 1/1333* (2006.01)

(52) U.S. Cl.
CPC .......... *G06F 3/044* (2013.01); *G02F 1/13338* (2013.01); *G09G 3/36* (2013.01)

(58) Field of Classification Search
CPC .......... G06F 3/044; G06F 3/041–3/047; G06F 2203/04101–2203/04113; G02F 1/13338; G09G 3/36
See application file for complete search history.

(56) References Cited

U.S. PATENT DOCUMENTS

| 5,847,690 A | 12/1998 | Boie et al. |
| 2003/0095091 A1* | 5/2003 | Enomoto ............. G09G 3/3655 345/87 |

(Continued)

FOREIGN PATENT DOCUMENTS

| CN | 102183853 A | 9/2011 |
| CN | 102749774 A | 10/2012 |

(Continued)

OTHER PUBLICATIONS

State Intellectual Property Office of the P.R.C (SIPO) Office Action 1 for 2015104980342 dated May 5, 2016 9 Pages.

(Continued)

*Primary Examiner* — Stephen G Sherman
(74) *Attorney, Agent, or Firm* — Anova Law Group, PLLC

(57) ABSTRACT

The present disclosure provides a method for driving an array substrate for fingerprint recognition. The method includes sequentially sending a switch-on signal by a processing unit to each gate line row by row along the column direction, the switch-on signal being divided into a first phase and a second phase. In the first phase of each switch-on signal, sending a touch-driving signal to pixel electrodes corresponding to the gate line through a first data line in each data line group, receiving a touch-sensing signal through a second data line in each data line group, and constructing a fingerprint pattern based on touch-sensing signals. In the second phase of each switch-on signal, simultaneously sending display signals to the first data line (Continued)

and the second data line in the data line groups to charge subpixel units corresponding to the gate line for displaying an image.

20 Claims, 5 Drawing Sheets

(56) References Cited

U.S. PATENT DOCUMENTS

| | | |
|---|---|---|
| 2004/0150629 A1 | 8/2004 | Lee |
| 2006/0256093 A1* | 11/2006 | Furukawa ............. G06F 3/0412 |
| | | 345/173 |
| 2009/0079707 A1* | 3/2009 | Kaehler .................. G06F 3/044 |
| | | 345/174 |
| 2011/0267293 A1* | 11/2011 | Noguchi ............... G06F 3/0416 |
| | | 345/173 |
| 2013/0093986 A1 | 4/2013 | Kesho et al. |
| 2013/0106926 A1* | 5/2013 | Li ...................... H04N 13/0429 |
| | | 345/691 |
| 2013/0314343 A1* | 11/2013 | Cho ...................... G06F 3/0412 |
| | | 345/173 |
| 2014/0198059 A1* | 7/2014 | Gu .......................... G06F 3/041 |
| | | 345/173 |
| 2014/0320386 A1* | 10/2014 | Li ........................ G09G 3/3677 |
| | | 345/87 |
| 2015/0177884 A1* | 6/2015 | Han ........................ G06F 3/044 |
| | | 345/174 |
| 2015/0185930 A1 | 7/2015 | Xu |
| 2016/0041664 A1 | 2/2016 | Qin et al. |

FOREIGN PATENT DOCUMENTS

| | | |
|---|---|---|
| CN | 103728760 A | 4/2014 |
| CN | 104020595 A | 9/2014 |
| CN | 104166489 A | 11/2014 |
| CN | 105183252 A | 12/2015 |

OTHER PUBLICATIONS

The World Intellectual Property Organization (WIPO) International Search Report for PCT/CN2015/099127 May 19, 2016 p. 1-4.

* cited by examiner

ARRAY SUBSTRATE, TOUCH SCREEN AND DISPLAY APPARATUS CONTAINING THE SAME, AND METHOD FOR DRIVING THE SAME

CROSS-REFERENCES TO RELATED APPLICATIONS

This PCT patent application is a national phase entry under 35 U.S.C. § 371 of International Application No. PCT/CN2015/099127, filed on Dec. 28, 2015, which claims priority of Chinese Patent Application No. 201510498034.2, filed on Aug. 13, 2015. The above enumerated patent applications are incorporated by reference herein in their entirety.

FIELD OF THE INVENTION

The present invention generally relates to the display technologies and, more particularly, relates to an array substrate, a touch screen and display apparatus containing the same, and a method for driving the same.

BACKGROUND

Fingerprints are unique and permanent features distinguishing one person from another. Often, a fingerprint includes a plurality of ridges and grooves on the skin of a finger. The patterns formed by the ridges and grooves often include ridge bifurcation, ridge ends, arches, tented arches, left-handed spiral whorls, right-handed spiral whorls, ulnar loops, double loops, etc., which determine the uniqueness of the fingerprint patterns. The fingerprint identification technologies developed based on the features of the fingerprints are used relatively early for personal identification verification. According to different ways of fingerprint collection and fingerprint input, the well-known and widely used fingerprint identification technologies include optical imaging, thermal sensing, human body far infrared sensing, etc.

Currently, touch screens with touch functions integrated into liquid crystal pixels, i.e., in-cell touch functions, have become popular because of advantages such as low fabrication cost and thin device volume. In existing touch technologies, the in-cell touch functions are implemented by attaching a touch film on a thin-film transistor-liquid crystal display (TFT-LCD) panel. The touch film senses touch motions so that the LCD panel and the touch film are driven separately to implement functions. However, the disadvantages of the above-mentioned structure include the display panel being bulky and heavy. Also, the touch film needs to be fabricated separately, which requires additional fabrication cost. The attaching or bonding process also increases the fabrication cost of the display screen.

Further, the existing touch technologies used in the screens of mobile phones or tablets often only recognize touch motions by a finger or a conductive stylus. As the market development of mobile payment and information security, fingerprint recognition is becoming more and more important.

Thus, it is desirable to improve the resolution of the in-cell touch screens with fingerprint recognition functions in exiting touch technologies.

BRIEF SUMMARY OF THE DISCLOSURE

The present disclosure provides an array substrate, a touch screen and display apparatus containing the same, and the method.

One aspect of the present disclosure includes a method for driving an array substrate for fingerprint recognition. The array substrate includes a plurality of subpixel units. Each subpixel unit includes a pixel electrode and a common electrode, a plurality of data lines arranged along a row direction, a plurality of gate lines arranged along a column direction, each subpixel unit being corresponding to a gate line and a data line. Two adjacent data lines forming a data line group. The method includes, sequentially sending a switch-on signal by a processing unit to each gate line row by row along the column direction, the switch-on signal being divided into a first phase and a second phase. In the first phase of each switch-on signal, sending a touch-driving signal by the processing unit to pixel electrodes corresponding to the gate line through a first data line in each data line group, receiving a touch-sensing signal through a second data line in each data line group by the processing unit, and constructing a fingerprint pattern based on touch-sensing signals by the processing unit. In the second phase of each switch-on signal, simultaneously sending display signals by the processing unit to the first data line and the second data line in the data line groups to charge subpixel units corresponding to the gate line for displaying an image.

Optionally, the first phase is for fingerprint recognition and the second phase is for charging the subpixel units.

Optionally, a duration of the switch-on signal is about 6.5 µs.

Optionally, a duration of the first phase is longer than a duration of the second phase.

Optionally, the switch-on signal outputted by a gate line is about 15 V.

Optionally, frequencies of the touch-driving signal and the touch-sensing signal are about 1 KHz to about 10 KHz.

Optionally, a potential of the touch-driving signal is about 1 V to about 10 V.

Optionally, the potential of the touch-driving signal is about 5 V.

Optionally, a potential of the touch-sensing signal is about 1 V to about 5 V.

Optionally, the potential of the touch-sensing signal is about 3 V.

Optionally, the switch-on signal is a high-potential signal.

Another aspect of the present disclosure provides an array substrate. The array substrate includes a plurality of gate lines arranged along a column direction; a plurality of data lines arranged along a row direction, two adjacent data lines forming a data line group; a plurality of subpixel units, each having a corresponding data line and a corresponding gate line, each subpixel unit including a pixel electrode and a common electrode; and a plurality of thin-film transistors (TFTs), each connecting one subpixel unit with the corresponding gate line and the corresponding data line.

Optionally, a common electrode in a subpixel unit is connected to a common electrode line shared by subpixel units in a same column.

Optionally, common electrodes included in subpixels of a same row are independent of each other.

Optionally, the subpixel units are liquid crystal subpixel units.

Another aspect of the present disclosure provides a touch screen. The touch screen includes one or more of the disclosed array substrates.

Optionally, the touch screen further includes a processing unit, the processing unit sequentially sending a switch-on signal to each gate line row by row along a column direction, the switch-on signal being provided through a first phase and a second phase.

Optionally, in the first phase of each switch-on signal, the processing unit sends a touch-driving signal to pixel electrodes corresponding to the gate line through a first data line in each data line group, receives a touch-sensing signal through a second data line in each data line group, and constructs a fingerprint pattern based on touch-sensing signals; and in the second phase of each switch-on signal, the processing unit simultaneously sends display signals to the first data line and the second data line in the data line groups to charge subpixel units corresponding to the gate line for displaying an image.

Optionally, the first phase is for fingerprint recognition and the second phase is for display charging of the subpixel units.

Another aspect of the present disclosure provides a display apparatus. The display apparatus includes one or more of the disclosed touch screens.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

Embodiments of the present disclosure provide an array substrate, a touch screen and display apparatus containing the same, and the method for driving the array substrate for integrating touch-motion sensors into the display screen. Also, the arrangement is implemented in subpixels to provide array substrates of higher resolution. Embodiments of the present disclosure provide in-cell touch screens with higher resolutions.

Figure 1:
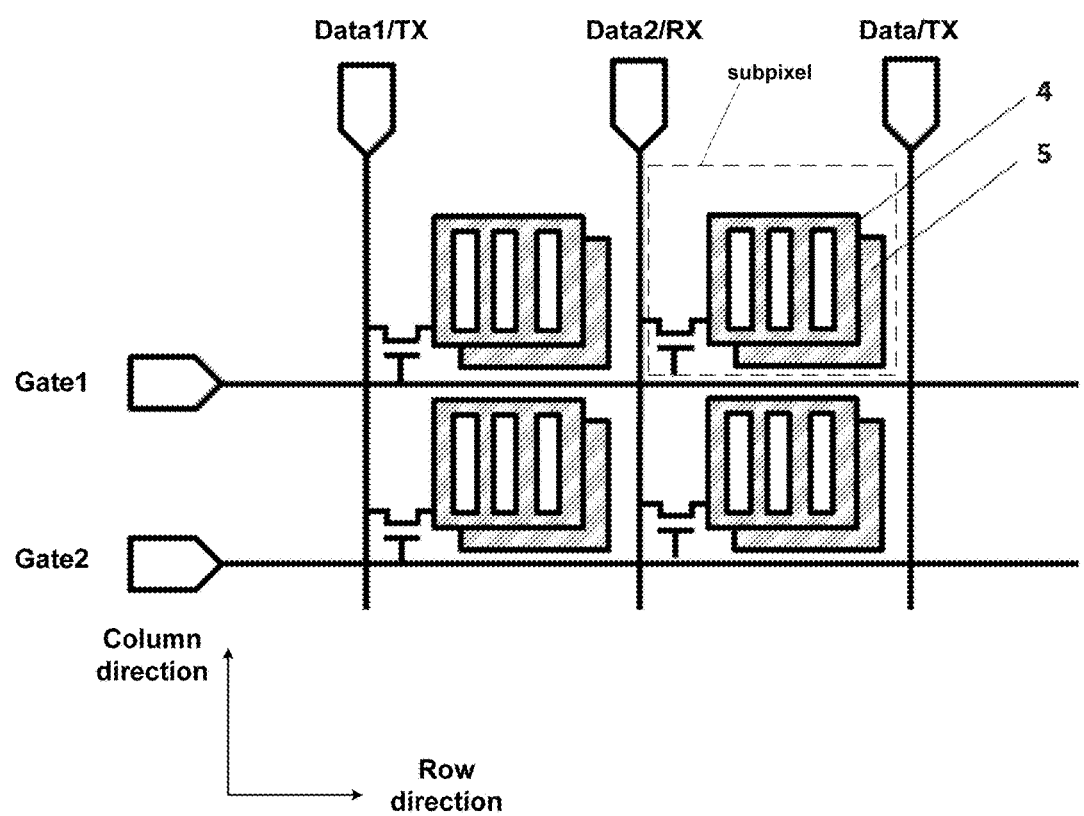
FIG. 1 illustrates a structure of an exemplary array substrate according to the embodiments of the present disclosure.

One aspect of the present disclosure provides an array substrate. As shown in FIG. 1, the array substrate may include a plurality of data lines, a plurality of gate lines, and a plurality of subpixel units surrounded by the gate lines and data lines. A subpixel unit may include a thin-film transistor (TFT), a pixel electrode 4, and a common electrode 5. The pixel electrode 4, shown in FIG. 1, is also shown as element 1 in FIG. 2. For viewing simplicity, FIG. 2 only shows the pixel electrodes, e.g., elements 1. The gate lines, e.g., Gate1 and Gate2 in FIG. 1, may be arranged along a column direction. The data lines, e.g., Data1/TX, Data/TX, and Data2/RX in FIG. 1, may be arranged along a row direction. The subpixel units may be repeatedly arranged in an array along the row direction and the column direction. For illustrative purposes, the disclosure only uses the operation of Data1/TX and Data2/TX as examples. The data line Data/TX and other data lines not shown in FIG. 1 may be arranged and have functions according to the description below.

As shown in FIG. 1, each subpixel unit may be corresponding to a gate line and a data line. A gate line may be used to control or send signals to the corresponding subpixel units through the TFTs connecting the gate line and the subpixel units. The pixel electrode and the common electrode included in a subpixel unit may correspond to the same gate line and the same data line. For example, as shown in FIG. 1, the region circled by the dashed lines may be a subpixel unit. The subpixel unit may correspond to the data line Data2/RX and the gate line Gate1. The subpixel unit may be connected to the data line Data2/RX and the gate line Gate1 through a TFT. That is, the pixel electrode 4 and the common electrode 5 included in the subpixel unit may also correspond to the data line Data2/RX and the gate line Gate1. Specifically, the pixel electrode 4 may be connected TFT and the pixel electrode 4 maybe separated from the common electrode 5 by light-emitting materials in between. For illustrative purposes, only one subpixel unit is described. Other subpixel units in the array substrate may correspond to the gate lines and the data lines in a similar manner and is not repeated herein.

According to the array substrate, the pixel electrodes used for touch-sensing functions may be arranged or set in subpixel units. Thus, the array substrate with higher resolution can be implemented. Further, in-cell touch screens with higher resolution can be realized. In the disclosure, a touch screen may refer to a screen with touch-sensing and display functions.

In some embodiments, the pixel electrode in each subpixel unit may be connected to the TFT in the subpixel unit; and the common electrodes in subpixel units of a same row may be connected to a common electrode line.

As shown in FIG. 1, in the active area, also referred as the pixel region, embodiments of the present disclosure are illustrated using fringe-field driven advanced super dimension switch (ADS) LCD technology. However, the pixel designs in the disclosed ADS LCDs in the present disclosure vary from the commonly used or existing ADS LCDs in several aspects. For example, the common electrodes 5 in a row of subpixel units may be independent to each other, and the common electrodes 5 in different rows of subpixel units may not be electrically connected. A pixel electrode 4 may be connected to a data line through the TFT in the same subpixel unit. The data line may be a data line adjacent to the subpixel unit. The data line may be a suitable signal line such as a signal line for receiving touch-sensing signals reflecting touch motions (e.g., RX signal in FIG. 1) or a signal line for sending touch-driving signals (e.g., TX signal in FIG. 1). The data line may be connected to a processing unit so that the processing unit may respond to the touch motions accordingly or execute certain functions based on pre-programmed applications. Thus, the data lines arranged along the row direction may transmit touch signals and display signals.

Figure 2:
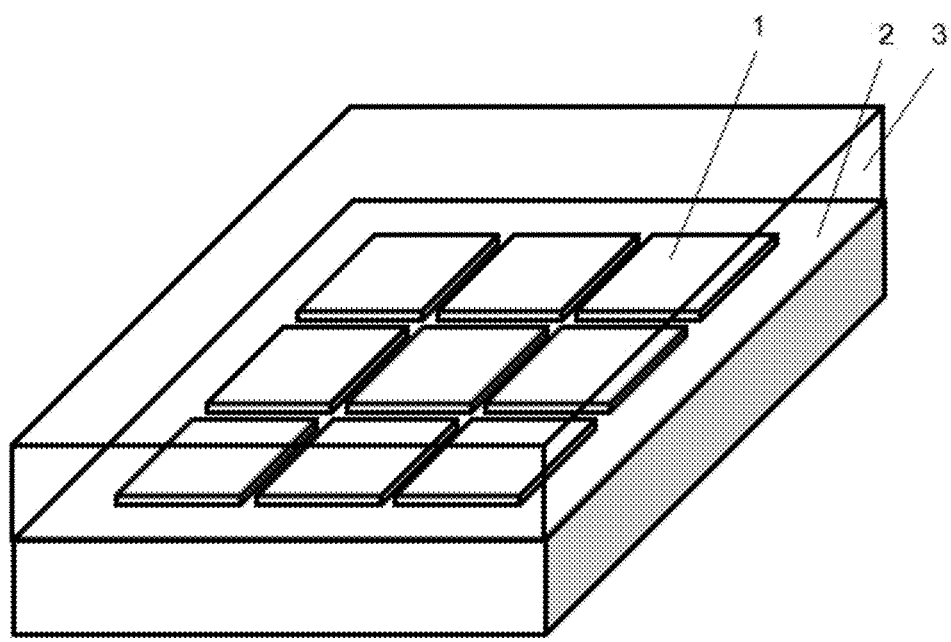
FIG. 2 illustrates a structure of an exemplary touch screen according to the embodiments of the present disclosure.

Another aspect of the present disclosure provides a touch screen. As shown in FIG. 2, the touch screen may include a top substrate 3 and a bottom substrate 2 facing each other. The touch screen may also include a plurality of pixel electrodes 1 (represented by elements 4 in FIG. 1) arranged between the top substrate 1 and the bottom substrate 2. Each of the pixel electrodes 1 may correspond to one subpixel unit, and vice versa. The pixel electrodes 1 may be used for touch functions and fingerprint recognition.

Often, our fingerprints are not flat, i.e., having ridges and grooves. When a finger touches a screen with fingerprint recognition functions, capacitance may be formed. The touch-sensing electrodes may sense the value or change of the capacitance and send information reflecting the value or change of the capacitance to the processing unit for further actions. Thus, because the touch-sensing electrodes distributed or arranged on the touch screen can be of sufficiently high density, the touch screen may be able to sense the ridges and grooves on the fingerprint and send electrical signals reflecting the sensed information to the processing unit. The processing unit may thus process the signals and proceed to fingerprint recognition. In FIG. 2, the structure of the touch screen with fingerprint recognition function is shown. In the touch screen, the pixel electrodes 1 positioned between the bottom substrate 2 and the top substrate 3 may be arranged in an array. Each pixel electrode 1 may be arranged in one subpixel unit. The bottom substrate 2 may be a glass substrate, and the top substrate may be a packaging glass.

By using the disclosed touch screen, the pixel electrodes used for touch-sensing functions may be used as sensors. The sensors may be fabricated or integrated into the inside of the touch screen. The sensors may be arranged in subpixel units. Thus, in-cell touch screens with higher resolution may be realized.

In some embodiments, the touch screen may be an LCD screen.

In some embodiments, the top substrate may be a color filter substrate and the bottom substrate may be a TFT substrate.

Figure 3A:
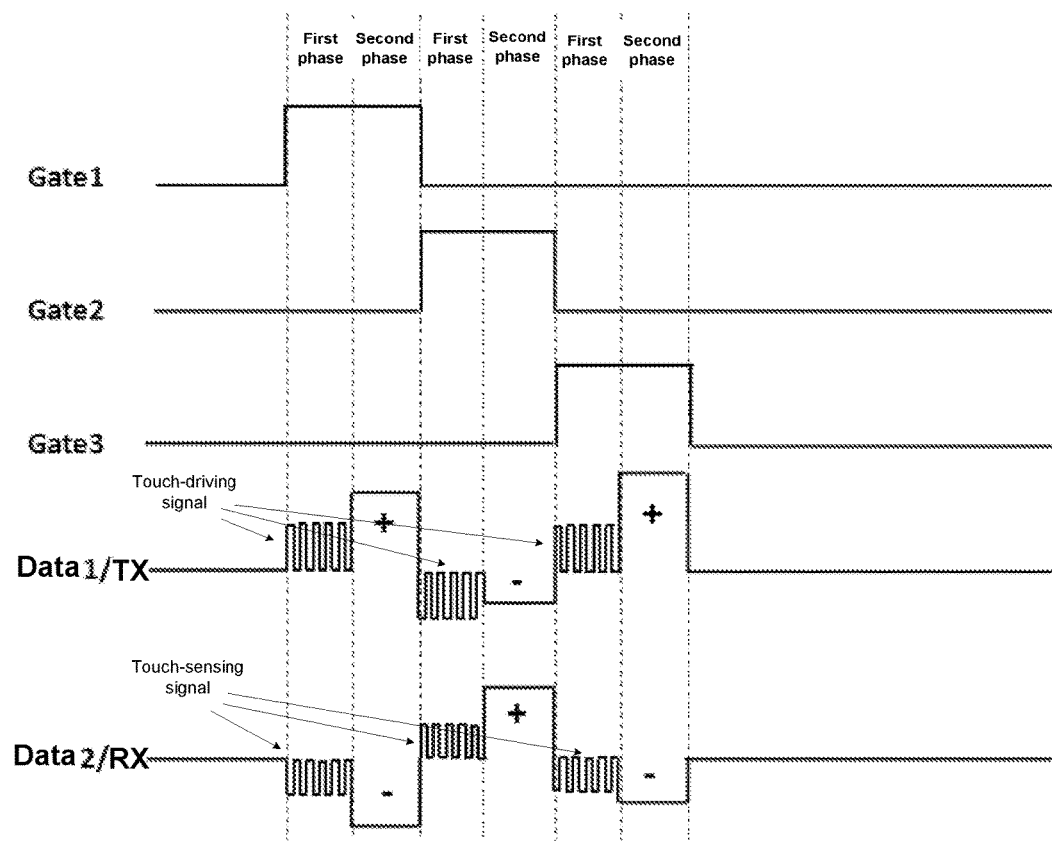
FIG. 3a illustrates an exemplary timing diagram of control signals used in the operation of a touch screen according to the embodiments of the present disclosure.

In some embodiments, two adjacent data lines may form a data line group. A data line group may include a first data line and a second data line. Data lines in a data line group may have different functions. The first data line Data1 may be the data line arranged in the first column in FIG. 1, labeled as "Data1/TX". The second data line Data2 may be the data line arranged in the second column in FIG. 1, labeled as "Data2/RX". For example, Data1/TX and Data2/RX may form a data line group. The first data line Data1/TX may be used for sending touch-driving signals, i.e., TX signals in FIG. 1, to the pixel electrodes 4. The second data line Data2/RX may be used for receiving touch-sensing signals, i.e., RX signals in FIG. 1. The touch screen may further include a processing unit (not shown in the figures). The processing unit may be used to sequentially output switch-on signals, e.g., high-potential signals, to each gate lines along the column direction, e.g., the gate lines Gate1 and Gate2 in FIG. 1. As shown in FIG. 3a, the processing unit may sequentially output a high-potential switch-on signal row by row from the gate line Gate1, gate line, Gate2, and to other gate lines, e.g., gate line Gate 3 (not shown). In one embodiment, the switch-on signal may be a high-potential signal. Based on the operation, the duration of the switch-on signal may be divided into two phases, a first phase and a second phase. For example, for the first gate line Gate1, the duration of the switch-on signal may include two phases. The first phase may be used for fingerprint recognition, and the second phase may be used for display charging of the subpixel units. The processing unit may include suitable software or hardware components to drive, control, and operate the touch screen. It should be noted that, the switch-on signal may also be a low-potential signal in certain embodiments. The specific types of switch-on signals may be determined according to the types of the TFTs connecting the gate lines and the corresponding subpixel units and should not be limited by the embodiments of the present disclosure.

When the processing unit is outputting a switch-on signal to a gate line in the first phase, the processing unit may send a touch-driving signal TX to the pixel electrodes through the first data line in each data line group, and the second data line in the data line group may receive a touch-sensing signal RX used for configuring a touch motion. That is, in the first phase, the pixel electrodes may be used as touch electrodes, i.e., electrodes used for sensing touch motions. In the second phase, when the processing unit is still outputting the switch-on signal, the processing unit may simultaneously send display charging signals to the first data line and the second data line in each data line group for charging the subpixel units. In one embodiment, the switch-on signal may be a high-potential signal. The display charging signals sent to the first data line and the second data line in a data line group may have opposite polarities. For example, as shown in FIG. 3a, in the fingerprint recognition phase, i.e., the first phase, the processing unit may output a high-potential signal to gate line Gate1. Meanwhile, the processing unit may send a touch-driving signal, i.e., a TX signal, to the pixel electrode corresponding to the first data line Data1 and the gate line Gate1, and the second data line Data2 may receive a touch-sensing signal, i.e., a RX signal. In the first phase, the gate line Gate1 may be switched on. The TFT connecting the subpixel unit corresponding to gate line Gate1 and data line Data1/TX may be turned on, and touch-driving signal TX may be sent to the pixel electrode in the subpixel unit through data line Data1/TX. The pixel electrode in the subpixel unit may be used to sense touch motions. The subpixel units in the same row may be operated simultaneously by the operation described above. The processing unit may switch on other gate lines along the column direction so that subpixel units in other rows of the array substrate may be operated in a same way. The touch screen may be able to sense touch motions and construct fingerprints. When a finger touches the touch screen, the electrical field formed by the pixel electrodes may change and electric current may be generated. The data lines Data2/RX may receive the change in electric current and send RX signals reflecting the change in electric current to the processing unit. The processing unit may configure the touch motion and/or fingerprint based on the RX signals.

In the display charging phase, i.e., the second phase, the processing unit may keep outputting the switch-on signal to the gate line Gate1. Meanwhile, the processing unit may output a first charging signal to the first data line Data1 for display scanning and simultaneously send a second charging signal to the second data line Data2 for display scanning. In one embodiment, the first charging signal may be a high-potential signal and the second charging signal may be a low-potential signal. Similarly, the operation of other gate lines, e.g., Gate2, and other data lines, may follow the operations of Gate1, Data1/TX, and Data2/RX described above, and is not repeated herein. The processing unit may sequentially switch on the gate lines along the column direction so that the subpixel units in the array substrate may be operated according to the timing shown in FIG. 3a.

In some embodiments, the processing unit may be a touch-sensing chip, to send TX signals and/or receive the RX signals and perform fingerprint recognition based on the RX signals.

The fingerprint recognition method provided by the embodiments of the present disclosure is based on self-capacitance. When a finger of a user approaches the sensors, because of the ridges and grooves of the finger surface, the distance between each point on the finger surface and the sensors is different, which affects the capacitance formed by the pixel electrodes. Thus, the charging time of the touch-sensing signals on the sensors may be longer. When the finger is touching the sensors, by detecting the differences in the signals received by the sensors at different times and positions, the two-dimensional pattern formed by the ridges and grooves of the finger can be detected. The fingerprint can be recognized.

The operation of the touch screen may be described using FIG. 1. In the active area, the pixel electrodes and the TFTs may be arranged in arrays. For an LCD, a pixel often includes two electrodes, i.e., a pixel electrode 4 and a common electrode 5. Electrical field may be formed between the pixel electrode 4 and the common electrode 5. The electrical field may enable the liquid crystal molecules to rotate such that the brightness of the LCD can be adjusted. Images can thus be properly displayed. Often, the LCDs are driven to display images according to a linear addressing method or process. In this case, when the gate line Gate1, in the first row, is outputting a switch-on signal, the first gate line Gate1 may be switched on by turning on the TFTs connecting the gate line Gate1 and corresponding subpixels. The processing unit may charge the pixel electrodes in the first row of subpixel units through the data lines, e.g., "Data1/TX" and "Data2/RX" in FIGS. 1 and 3, arranged along the row direction. Further, the TFTs may be turned off and the electrical filed, corresponding to a potential drop between the pixel electrode 4 and the common electrode 5, may be formed between the pixel electrode 4 and the common electrode 5. The value of the potential drop may be dependent on the charging potentials of the data lines when charging the pixel electrodes. Under the potential provided by the data lines, the potential drop between the pixel electrode 4 and the common electrode 5 may be formed. Liquid crystal molecules may be rotated according to the potential drop and the brightness of the touch screen may be controlled. For illustrative purposes, the data lines in the first column and the second column are labeled as Data1/TX and Data2/RX, as shown in FIG. 1. Data lines in other columns can also be operated in the same way as described in this disclosure. The numbers do not indicate any difference in the functions of data lines.

As shown in FIG. 1, before charging the pixel electrodes 4, a touch function scanning process may be performed. A transmission terminal line, i.e., the first data line Data1/TX in FIGS. 1 and 3, may be turned on. As shown in FIG. 3a, the timing chart for driving the array substrate is illustrated. According to FIG. 3a, the gate line Gate1, in the first row, may output a switch-on signal, e.g., a high-potential signal, to turn on the TFTs connected to the gate line Gate1. The touch-driving signal TX may be transmitted from the transmission terminal lines, e.g., the first data line Data1/TX, to the pixel electrodes 4. Meanwhile, an adjacent data line, i.e., the second data line Data2 in FIGS. 1 and 3, may receive a touch-sensing signal RX, reflecting any touch motions, as shown in FIG. 3a. When a touch motion occurs, change in the capacitance formed by the pixel electrodes 4 may be used for fingerprint recognition. When a finger approaches or touches the pixel electrodes, the capacitance formed by the pixel electrodes 4 may change. Electric current may be generated and may be transmitted to the processing unit through the data line Data2/RX. The processing unit may configure the touch motion and determine the strength of the touch motion. Further, the processing unit may perform fingerprint recognition. In one embodiment, the first data line Data1/TX may be the data line in the first column of FIG. 1 and the second data line Data2/RX may be the data line in the second column of FIG. 1. It should be noted that, the column numbers of the data lines are only for illustrative purposes. Data lines positioned in other columns may also be operated through the same way as described above.

Thus, the first phase, i.e., the fingerprint recognition phase, may also be referred as a phase for touch-sensing, charging, and detecting; and the second phase, i.e., the display charging phase, may also be referred as a phase for charging the display signal. The touch function scanning process described above may be repeated on each row of subpixel units until the touch function scanning of the last row is completed. The touch function scanning process may determine the relationship between subpixel units. That is, some subpixel units, corresponding to the TX signal, may be transmission electrodes. Some subpixel units, corresponding to the RX signals, may be receiving electrodes. Touch motions can be accurately determined. Fingerprint recognition may be performed properly.

Figure 3B:
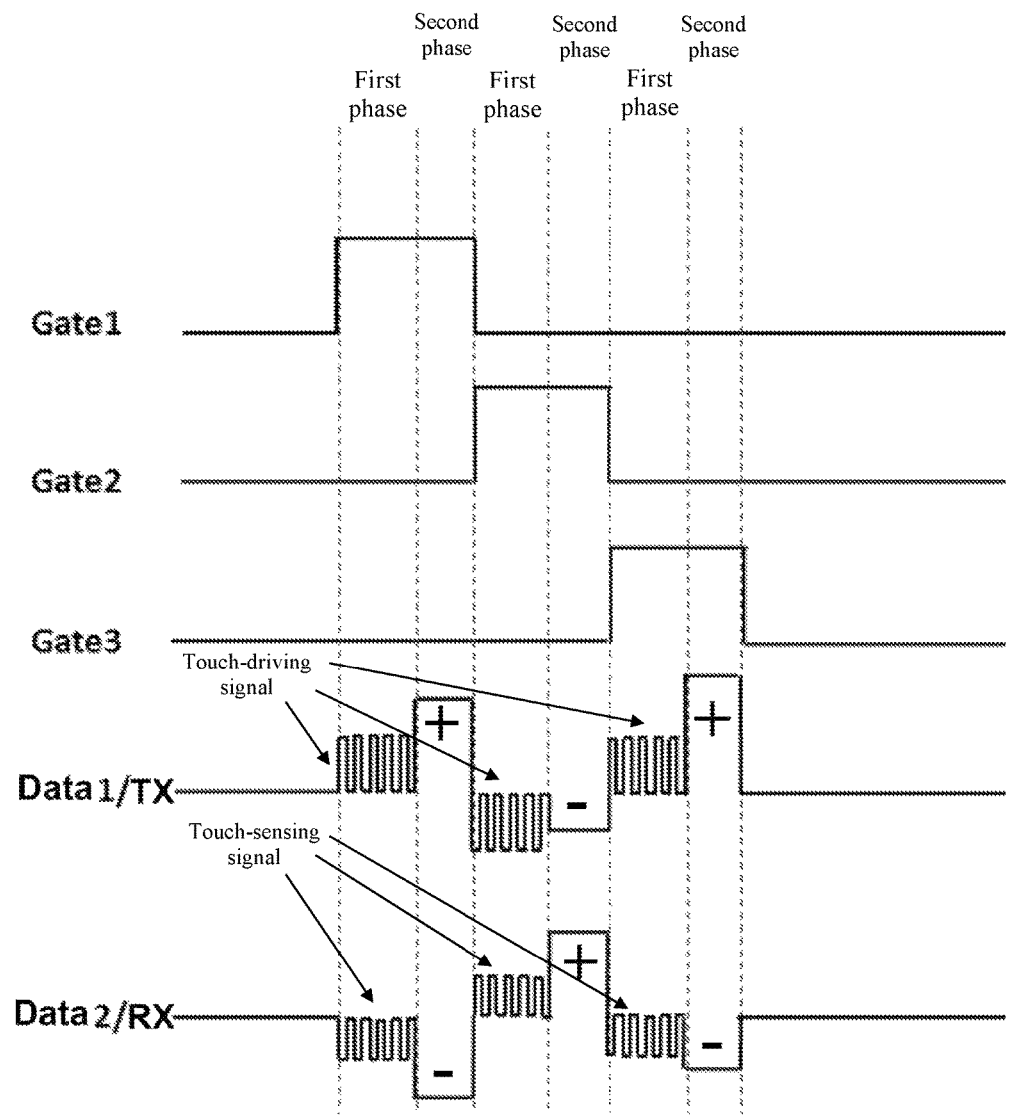
FIG. 3b illustrates another exemplary timing diagram of control signals used in the operation of a touch screen according to the embodiments of the present disclosure.

It should be noted that, in some embodiments, for a touch screen with a fixed display resolution, to increase or improve the precision of fingerprint recognition functions, the specific durations of the first phase and the second phase may be adjusted or changed according to different applications. For example, for a higher precision of fingerprint recognition, the first phase may be longer than the second phase in the duration of one switch-on signal as illustrated in FIG. 3b. That is, in some embodiments, the first phase may be longer than 50% of the duration of a switch-on signal and the second phase may be shorter than 50% of the duration of a switch-on signal.

Another aspect of the present disclosure provides a touch screen. The touch screen includes one or more of the disclosed array substrates. The touch screen also includes the processing unit for controlling and driving the disclosed array substrate.

Figure 4:
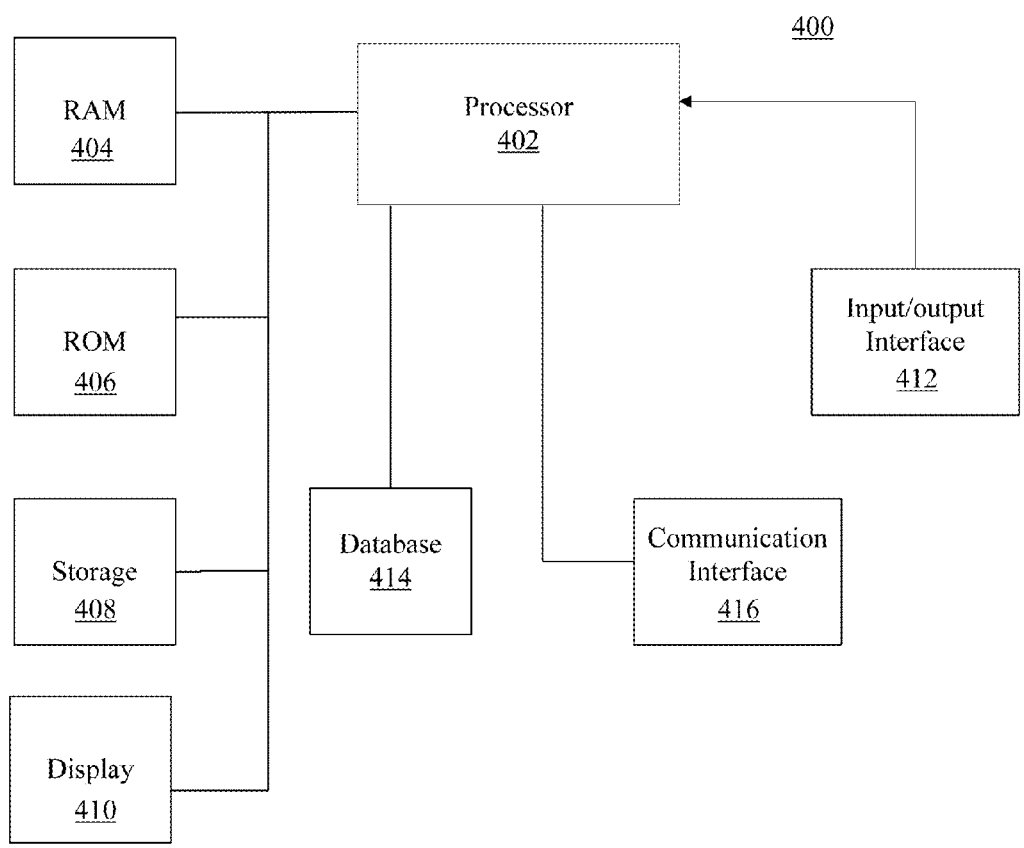
FIG. 4 illustrates a block diagram of the processing unit in embodiments of the present disclosure.

FIG. 4 illustrates the block diagram of the processing unit used in the embodiments of the present disclosure. The processing unit 400 may accept, process, and execute commands from the various components of the display apparatus. The processing unit 400 may include any appropriately configured computer the processing unit. As shown in FIG. 4, the processing unit 400 may include a processor 402, a random access memory (RAM) 404, a read-only memory (ROM) 406, a storage 408, a display 410, an input/output interface 412, a database 414; and a communication interface 416. Other components may be added and certain devices may be removed without departing from the principles of the disclosed embodiments.

Processor 402 may include any appropriate type of general purpose microprocessor, digital signal processor or microcontroller, and application specific integrated circuit (ASIC). Processor 402 may execute sequences of computer program instructions to perform various processes associated with the processing unit 400. Computer program instructions may be loaded into RAM 404 for execution by processor 402 from read-only memory 406, or from storage 408. Storage 408 may include any appropriate type of mass storage provided to store any type of information that processor 402 may need to perform the processes. For example, storage 408 may include one or more hard disk devices, optical disk devices, flash disks, or other storage devices to provide storage space.

Display 410 may provide information to a user or users of the processing unit 400. Display 410 may include any appropriate type of computer display device or electronic device display (e.g., CRT or LCD based devices). Input/output interface 412 may be provided for users to input information into the processing unit 1200 or for the users to receive information from the processing unit 1200. For example, input/output interface 1212 may include any appropriate input device, such as a keyboard, a mouse, an electronic tablet, voice communication devices, or any other optical or wireless input devices. Further, input/output interface 412 may receive from and/or send to other external devices.

Further, database 414 may include any type of commercial or customized database, and may also include analysis tools for analyzing the information in the databases. Database 414 may be used for storing information for semiconductor manufacturing and other related information. Communication interface 416 may provide communication connections such that the processing unit 400 may be accessed remotely and/or communicate with other the processing units through computer networks or other communication networks via various communication protocols, such as transmission control protocol/internet protocol (TCP/IP), hyper text transfer protocol (HTTP), etc.

In one embodiment, the processing unit 400 may send touch-driving signals through the TX data lines, e.g., Data1/TX, to the common electrodes in the first phase. A user may touch the touch screen with a finger and touch-sensing signals reflecting the touch motion are sent to the processing unit through a plurality of RX data lines, e.g., Data2/RX. The processor 402 may accept, process, and execute the commands to obtain the signals. The communication interface can communicate with touch screen to collect and process the signals obtained reflecting the touch motion. Suitable data may be stored in ROM 406 and storage 408 to be processed. After the data is processed, result of the touch motion or the fingerprint recognition can be determined by the processor. The result can be returned to the user via the display 410 or the input/output interface 412.

Another aspect of the present disclosure provides a display apparatus. The display apparatus may include one or more of the touch screens disclosed by the present disclosure.

Another aspect of the present disclosure provides a method for driving the touch screen. The method includes a plurality of steps.

First, a processing unit may sequentially input a switch-on signal, e.g., a high-potential signal, into each gate line along the column direction, as shown in FIG. 3*a*. The high-potential signal may be divided into two phases. The first phase is configured for fingerprint recognition and the second phase is configured for display charging of the subpixel units.

Further, when the processing unit is inputting the switch-on signal into a gate line, in the first phase, the processing unit may send a touch-driving signal, i.e., a TX signal, to the pixel electrodes corresponding to the gate line through the first data line in each data line group, and the second data line in the data line groups may receive a touch-sensing signal, i.e., a RX signal. In the second phase, the processing unit may keep inputting the switch-on signal to the gate line, and the processing unit may send display charging signals to the first data line and the second data line in each data line group to charge the subpixel units corresponding to the gate line.

As shown in FIG. 1, two adjacent data lines, e.g., Data1/TX and Data2/RX, may form a data line group. A data line group may include a first data line and a second data line. Data lines in a data line group may have different functions. The first data line may be used for sending touch-driving signals, i.e., TX signals in FIG. 1. The second data line may be used for receiving touch-sensing signals, i.e., RX signals in FIG. 1. The processing unit may output a switch-on signal row by row from the first gate line Gate1. The processing unit may further output the switch-on signal sequentially to gate lines Gate2 and Gate 3 (not shown). In one embodiment, the switch-on signal may be a high-potential signal.

In the first phase, when the processing unit is outputting a switch-on signal to a gate line, the processing unit may send a touch-driving signal TX to the pixel electrodes through the first data line in each data line group, and the second data line in the data line group may receive a touch-sensing signal RX used for configuring touch motions. The second data line in the data line group may send the RX signal to the processing unit for configuration of touch motions and fingerprints. That is, in the first phase, the pixel electrodes may be used as touch electrodes, i.e., electrodes used for sensing touch motions.

In the second phase, when the processing unit is still outputting the switch-on signal to the same gate line, the processing unit may simultaneously send display charging signals to the first data line and the second data line in each data line group for charging the subpixel units. In one embodiment, the switch-on signal may be a high-potential signal. The display charging signals sent to the first data line and the second data line in a data line group may have opposite polarities.

For example, as shown in FIGS. 1 and 3, in the fingerprint recognition phase, i.e., the first phase, the processing unit may output a high-potential signal switch-on signal to gate line Gate1. Meanwhile, the processing unit may send a touch-driving signal, i.e., a TX signal, to the pixel electrode corresponding to the first data line Data1 and the gate line Gate1, and the second data line Data2 may receive a touch-sensing signal, i.e., a RX signal. That is, in the first phase, the gate line Gate1 may be switched on. The TFT connecting the subpixel unit corresponding to gate line Gate1 and data line Data1/TX may be turned on, and touch-driving signal TX may be sent to the pixel electrode in the subpixel through data line Data1/TX. The pixel electrode in the subpixel unit may be used to sense touch motions. The subpixel units in the same row may be operated simultaneously according to the operation described above. The processing unit may sequentially switch on other gate lines along the column direction so that subpixel units in other rows of the array substrate may be operated in a same way. The touch screen may be able to sense touch motions. When a finger touches the touch screen, the electrical field formed by the pixel electrodes may change and electric current may be generated. The data lines Data2/RX may receive the change in electric current and send RX signals reflecting the change in electric current to the processing unit. The processing unit may configure the touch motion and/or fingerprint based on the RX signals.

In the display charging phase, i.e., the second phase, the processing unit may keep outputting the switch-on signal to the gate line Gate1. Meanwhile, the processing unit may output a first charging signal to the first data line Data1/TX for display scanning and simultaneously send a second charging signal to the second data line Data2/RX for display scanning. In one embodiment, the first charging signal may be a high-potential signal and the second charging signal may be a low-potential signal. Similarly, the operation of other gate lines, e.g., Gate2, and other data lines, may follow the operations of Gate1, Data1/TX, and Data2/RX described above, which is not repeated herein. The processing unit may sequentially switch on the gate lines along the column direction so that the subpixel units in the array substrate may be operated according to the timing shown in FIG. 3a.

In some embodiments, the duration of the switch-on signal outputted by a gate line may be about 6.5 μs.

In some embodiments, the duration of the first phase may be longer than the duration of the second phase.

In some embodiments, the switch-on signal outputted by a gate line may be about 15 V.

The touch-driving signal and the touch-sensing signal may each have a square wave, as shown in FIG. 3a. In some embodiments, the frequencies of the touch-driving signal and the touch-sensing signal may be about 1 KHz to about 10 KHz. The amplitudes of the touch-driving signal and the touch-sensing signal may be constant or may vary in different first phases.

In some embodiments, the potential of the touch-driving signal may be about 1 V to about 10 V. In certain embodiments, the potential of the touch-driving signal may be about 5 V.

In some embodiments, the potential of the touch-sensing signal may be about 1 V to about 5 V. In certain embodiments, the potential of the touch-sensing signal may be about 3 V.

Thus, the present disclosure provides the structure of an in-cell touch screen with high resolution, and the method for driving the touch screen. By applying or implementing a sensor in each subpixel unit, a touch screen with a high resolution may be realized. According to the present disclosure, a sensor may be implemented in each subpixel unit. The resolution of the disclosed touch screen may be greatly improved. The touch resolution may thus be sufficiently high for fingerprint recognition functions.

It should be understood by those skilled in the art that, embodiments of the present disclosure may provide a method, a system, and/or a computer program product. Thus, the present disclosure may be implemented by embodiments using hardware, embodiments using software, or embodiments using both hardware and software. Further, the present disclosure may be in the form of one or more computer program products with computer usable program languages stored and operated in a suitable computer usable media. The media may include but may not be limited to disk storage and optical storage.

The present disclosure is described based on the operation of the embodiments, the apparatus or system, and the process flow chart and/or block diagram of the computer program. It should be noted that, each process flow, block, or a combination of a step and a block in the flow chart and/or block diagram may be realized by suitable computer programs. The computer program commands may be used on a general-purpose computer, a special-purpose computer, an embedded processor, and/or other programmable data processing devices to generate a virtual device. Thus, the computer commands executed by the computer and/or other programmable data processing devices may be used to realize the functions of the devices illustrated by one or more process flows in the process flow chart and/or one or more blocks in the block diagram.

The computer program commands may also be stored in a readable memory of a computer. The readable memory may be used to control or direct computers or other programmable data processing devices to function according to a certain manner so that the program commands stored in the readable memory may generate a product including a commanding device. The commanding device may realize the functions of the devices illustrated by one or more process flows in the process flow chart and/or one or more blocks in the block diagram.

The computer program commands may also be installed on computers or any other suitable programmable data processing devices so that a plurality of operation steps can be executed on the computer or other suitable programmable data processing devices to obtain computer processing. Thus, executing commands on the computer or other suitable programmable data processing devices can be used to realize the functions of the devices illustrated by one or more process flows in the process flow chart and/or one or more blocks in the block diagram.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for driving an array substrate for fingerprint recognition, the array substrate including a plurality of subpixel units, each subpixel unit including a pixel electrode and a common electrode, a plurality of data lines arranged along a row direction, a plurality of gate lines arranged along a column direction, each subpixel unit being corresponding to a gate line and a data line, two adjacent data lines forming a data line group, the method comprising:
   sequentially sending switch-on signals by a processor to the gate lines row by row along the column direction, a duration of one of the switch-on signals on a single one of the gate lines being divided into a first phase and a second phase with respect to time, wherein:
      the first phase and the second phase are non-overlapping with respect to time, a combination of the first phase and the second phase corresponds to the duration of the one of the switch-on signals on the single one of the gate lines;
   in the first phase of the one of the switch-on signals, sending a touch-driving signal by the processor to a pixel electrode corresponding to the gate line through a first data line in each data line group, receiving a touch-sensing signal through a second data line in each data line group by the processor, and constructing a fingerprint pattern based on touch-sensing signals by the processor; and
   in the second phase of the one of the switch-on signals, simultaneously sending display signals by the processor to the first data lines and the second data lines in the data line groups to charge subpixel units corresponding to the gate line for displaying an image, a first data line in each data line group transmitting the touch-driving signal and the display signal respectively in the duration of the one of the switch-on signals, and a second data line in each data line group transmitting the touch-sensing signal and the display signal respectively in the duration of the one of the switch-on signals.

2. The method according to claim 1, wherein:
   the first phase is for fingerprint recognition and the second phase is for charging the subpixel units.

3. The method according to claim 1, wherein the duration of the one of the switch-on signals on the single one of the gate lines is about 6.5 μs.

4. The method according to claim 1, wherein a duration of the first phase is longer than a duration of the second phase.

5. The method according to claim 1, wherein a potential of the one of the switch-on signals outputted by a gate line is about 15 V.

6. The method according to claim 1, wherein frequencies of the touch-driving signal and the touch-sensing signal are about 1 KHz to about 10 KHz.

7. The method according to claim 1, wherein a potential of the touch-driving signal is about 1 V to about 10 V.

8. The method according to claim 7, wherein the potential of the touch-driving signal is about 5 V.

9. The method according to claim 1, wherein a potential of the touch-sensing signal is about 1 V to about 5 V.

10. The method according to claim 9, wherein the potential of the touch-sensing signal is about 3 V.

11. The method according to claim 1, wherein the one of the switch-on signals is a high-potential signal.

12. An array substrate, comprising:
a plurality of gate lines arranged along a column direction;
a plurality of data lines arranged along a row direction, two adjacent data lines forming a data line group;
a plurality of subpixel units, each having a corresponding data line and a corresponding gate line, each subpixel unit including a pixel electrode and a common electrode; and
a plurality of thin-film transistors (TFTs), each connecting one subpixel unit with the corresponding gate line and the corresponding data line, wherein:
the plurality of gate lines sequentially transmit switch-on signals row by row, and a duration of one of the switch-on signals is divided into a first phase and a second phase with respect to time;
the first phase and the second phase are non-overlapping with respect to time, a combination of the first phase and the second phase corresponds to the duration of the one of the switch-on signals on the single one of the gate lines;
in the first phase of the one of the switch-on signals, a first data line in each data line group transmits a touch-driving signal to a pixel electrode corresponding to the gate line, and a second data line in each data line group transmits a touch-sensing signal; and
in the second phase of the one of the switch-on signals, the first data lines and the second data lines in the data line groups simultaneously transmit display signals to charge subpixel units corresponding to the gate line for displaying an image, a first data line in each data line group transmitting the touch-driving signal and the display signal respectively in the duration of the one of the switch-on signals, and a second data line in each data line group transmitting the touch-sensing signal and the display signal respectively in the duration of the one of the switch-on signals.

13. The array substrate according to claim 12, wherein a common electrode in a subpixel unit is connected to a common electrode line shared by subpixel units in a same column.

14. The array substrate according to claim 12, wherein common electrodes included in subpixels of a same row are independent of each other.

15. The array substrate according to claim 12, wherein the subpixel units are liquid crystal subpixel units.

16. A touch screen, including one or more of the array substrates according to claim 12.

17. The touch screen according to claim 16, further including a processor, the processor is configured to sequentially send the switch-on signals to the gate lines row by row along the column direction.

18. The touch screen according to claim 17, wherein the processor is further configured to:
in the first phase, send the touch-driving signal to the first data line in each data line group, receive the touch-sensing signal through the second data line in each data line group, and construct a fingerprint pattern based on touch-sensing signals; and
in the second phase, simultaneously send the display signals to the first data lines and the second data lines in the data line groups to charge the subpixel units corresponding to the gate line for displaying the image.

19. The touch screen according to claim 18, wherein the first phase is for fingerprint recognition and the second phase is for display charging of the subpixel units.

20. A display apparatus, including one or more of the touch screens according to claim 16.

* * * * *